(12) United States Patent
Bailer et al.

(10) Patent No.: US 7,207,865 B2
(45) Date of Patent: Apr. 24, 2007

(54) APPARATUS FOR MACHINING WORKPIECES, IN PARTICULAR WORKPIECES PROVIDED WITH CUTTING TEETH

(75) Inventors: Norbert Bailer, Schemmerhofen-Altheim (DE); Peter Lenard, Biberach (DE); Ernst Beck, Biberach (DE)

(73) Assignee: Vollmer Werke Maschinenfabrik GmbH (DE)

( * ) Notice: Subject to any disclaimer, the term of this patent is extended or adjusted under 35 U.S.C. 154(b) by 31 days.

(21) Appl. No.: 11/082,171

(22) Filed: Mar. 16, 2005

(65) Prior Publication Data
US 2005/0208877 A1    Sep. 22, 2005

(30) Foreign Application Priority Data
Mar. 16, 2004  (DE) ...................... 10 2004 012 841

(51) Int. Cl.
*B24B 49/00* (2006.01)
(52) U.S. Cl. ............................. 451/9; 451/10; 451/11; 451/184
(58) Field of Classification Search .................. 451/9, 451/10, 11, 182, 184, 185, 224, 229, 234, 451/5
See application file for complete search history.

(56) References Cited

U.S. PATENT DOCUMENTS

| | | | | |
|---|---|---|---|---|
| 2,546,914 A | * | 3/1951 | Wheeler | 451/185 |
| 3,376,672 A | * | 4/1968 | Schmidt | 451/184 |
| 3,579,920 A | * | 5/1971 | Heilberger | 451/329 |
| 3,906,681 A | * | 9/1975 | Seidel | 451/26 |
| 3,992,820 A | * | 11/1976 | Suter | 451/269 |
| 4,119,015 A | * | 10/1978 | Tuda et al. | 409/201 |
| 4,815,239 A | * | 3/1989 | Sommer | 451/5 |
| 5,402,607 A | * | 4/1995 | Lombard | 451/5 |
| 5,512,009 A | * | 4/1996 | Earl | 451/300 |
| 6,010,394 A | * | 1/2000 | Dieck et al. | 451/141 |
| 6,224,462 B1 | * | 5/2001 | Yokoyama et al. | 451/10 |
| 6,379,218 B1 | * | 4/2002 | Bailer et al. | 451/8 |
| 6,428,453 B1 | | 8/2002 | Hoppe et al. | |
| 6,685,538 B1 | * | 2/2004 | Farre | 451/8 |
| 6,685,544 B1 | * | 2/2004 | Dieck et al. | 451/141 |
| 6,743,077 B2 | * | 6/2004 | Busenhart | 451/40 |
| 2005/0159079 A1 | * | 7/2005 | Castanares et al. | 451/5 |
| 2005/0260926 A1 | * | 11/2005 | Junker | 451/11 |

FOREIGN PATENT DOCUMENTS

| | | |
|---|---|---|
| EP | 0893196 | 1/1999 |
| EP | 1378315 | 1/2004 |
| WO | WO 96/37328 | 11/1996 |

* cited by examiner

*Primary Examiner*—Eileen P. Morgan
(74) *Attorney, Agent, or Firm*—Woodard, Emhardt, Moriarty, McNett & Henry LLP (57) ABSTRACT

In an apparatus for machining workpieces, in particular workpieces provided with cutting teeth, such as bandsaw blades or circular-saw blades for example, comprising a base (12), a machining device (18) displaceable relative to the base (12) and having at least one machining tool (20) rotationally drivable about a drive axis, and a clamping device (14) for securing the workpiece to be machined, the machining device (18) being designed with a multiaxis arrangement (24), by means of which the machining tool (20) can be positioned in different machining positions relative to the workpiece to be machined, it is provided that the multiaxis arrangement (24) is received within a support frame (26) open on at least one side and coupled to the base (12).

13 Claims, 10 Drawing Sheets

APPARATUS FOR MACHINING WORKPIECES, IN PARTICULAR WORKPIECES PROVIDED WITH CUTTING TEETH

Foreign priority benefits under Title 35 United States Code §119 are claimed from German Patent Application No. 10 2004 012 841.3, filed on Mar. 16, 2004.

The present invention relates to an apparatus for machining workpieces, in particular workpieces provided with cutting teeth, such as bandsaw blades or/and circular-saw blades for example, comprising a base, a machining device displaceable relative to the base and having at least one machining tool rotationally drivable about a drive axis, and a clamping device for securing the workpiece to be machined, the machining device being designed with a multiaxis arrangement, by means of which the machining tool can be positioned in different machining positions relative to the workpiece to be machined.

An apparatus for machining bandsaw blades is known, for example, from WO 96/37328. With this known apparatus, the tooth face of cutting teeth of bandsaw blades can be machined. This is done by a grinding carriage, to which a grinding wheel is attached, being displaceable strokewise along a positioning axis. Such a machine has relatively few variation possibilities for the machining. It has been found in the prior art that, to extend the use possibilities of such machines, it is necessary to arrange, in addition to the stroke axis for strokewise movement of the grinding wheel, further axes which enable virtually any positioning of the grinding wheel or a further grinding tool relative to the bandsaw blade or to another workpiece to be machined. In the past therefore, in addition to the stroke axis, various other positioning axes have been provided to displace the grinding tool. With the increase in the number of these positioning axes, the structure of the machines required more and more space. A considerable problem involved leading away the mechanical stresses occurring on the grinding wheel via the various guide arrangements assigned to the respective positioning axes. Owing to the space-requiring construction, considerable lever arms result between the place of origin of forces, namely the contact point of the grinding wheel and the workpiece to be machined, and the guiding of the machining device along the respective positioning axes. Consequently, considerable distortions occurred, which led to dimensional inaccuracies and unsatisfactory machining results.

It is therefore an object of the present invention to provide an apparatus of the type described at the outset, in which the lever forces occurring and the distortions resulting therefrom can be kept low.

This object is achieved by an apparatus of the type described at the outset, in which the multiaxis arrangement is received within a support frame open on at least one side. By arranging the multiaxis arrangement within a support frame open on at least one side and coupled to the base, it is possible to lead the machining forces, originating from the machining device and transmitted via the multiaxis arrangement, directly into the support frame and thus avoid long force transmission paths and hence long lever arms. The support frame can in this case be designed correspondingly massively with reinforcing ribs and high deflection resistance as well as high distortion resistance and thus prevents distortion of the multiaxis arrangement under the effect of the machining forces occurring during the machining. As a result, owing to the increased stability provided by the support frame, better machining results in terms of accuracy and reproducibility can be obtained.

According to an embodiment variant of the invention, it is provided that the multiaxis arrangement is received in a central opening of the support frame and enclosed by the support frame. The stability of the entire arrangement can thereby be increased. A closed support frame which receives the multiaxis arrangement at its centre affords a very high distortion resistance and comparatively extensive surfaces for leading in machining forces occurring on the multiaxis arrangement. Moreover, the ease of assembly of the apparatus according to the invention is improved by such a support frame. The multiaxis arrangement can thus be inserted into the support frame and mounted there more easily than is the case with multiaxis arrangements which have to be attached to a machine frame in a virtually cantilevered manner.

With regard to a multiaxis arrangement, a development of the invention provides that the multiaxis arrangement has a first positioning axis which enables displacement of the machining tool within the support frame in the direction along the longitudinal extent or the transverse extent of the support frame.

Moreover, additionally or alternatively to the first positioning axis, it can be provided that the multiaxis arrangement has a second positioning axis which enables displacement of the machining tool within the support frame in the direction orthogonal to a plane defined by the direction of the longitudinal extent and the direction of the transverse extent of the support frame.

To carry out tooth-flank-grinding work, a development of the invention provides that the machining device has a further machining tool rotationally drivable about a further machining axis, machining axes of the machining tools running substantially parallel to one another. Accordingly, two rotationally drivable machining tools, such as two grinding wheels for example, are provided, which can engage simultaneously on mutually opposite tooth flanks of the workpiece to be machined, for example a bandsaw blade or a circular-saw blade.

To simplify the structure, a development of the invention provides that the two machining axes are assigned to the first positioning axis and displaceable along the latter independently of one another. This means that the two machining tools, for example the two grinding wheels, are displaceable together with their rotary drives along one and the same positioning axis utilising the guide means assigned to this axis, each of the machining axes being assigned its own drive however, so that the two machining axes are displaceable independently of one another. As a result, a space-saving arrangement along with a high degree of manufacturing flexibility can be achieved.

A development of the invention provides that the support frame is received in a receiving frame. In this context, it can furthermore be provided that the support frame is received in a central opening of the receiving frame and enclosed by the receiving frame. In this case, it is possible according to the invention to displace the support frame within the receiving frame along the third positioning axis, so that, in combination with the first and second positioning axis, it is possible to position the machining tool along three axes substantially orthogonal to one another. With such an arrangement, i.e. with a multiaxis arrangement within the support frame, the latter being displaceable within the receiving frame along a third axis, all positions in space can be reached with a compact construction which meets the exacting demands in terms of force transmission and stability.

To allow further degrees of freedom with regard to the positioning of the machining tool or tools to be achieved, a development of the invention provides that the receiving frame is displaceable, preferably pivotable about a pivot axis, relative to the base. As a result, the inclination of the receiving frame and hence of the support frame and ultimately the inclination of the machining tool or tools relative to the workpiece to be machined can be adjusted.

According to a development of the invention, it is provided that the machining tool engages, at a predetermined geometrical point, on the workpiece to be machined, the pivot axis running substantially through the geometrical point. As already established at the outset with regard to the prior art, it is of particular importance to arrange the different positioning axes and the guides assigned to them in spatial proximity to the geometrical point, in order to keep the lever arms which occur and the distortions resulting therefrom as small as possible. By using a support frame and a receiving frame which receives it, the multiaxis arrangement can be united in a compact construction and the distances between the individual guides of the positioning axes and the pivot axis can be kept small. In a development of this concept, the invention furthermore provides that the receiving frame is arranged above the clamping device and that the machining device projects out of the receiving frame downwards towards the clamping device. Owing to the high stability and deflection as well as distortion resistance of the frame arrangement formed from support frame and receiving frame, it is possible, without significant distortions, to arrange the machining tool or tools in a position, which can easily be seen and monitored, above the clamping device. Moreover, the open design of the support frame and the receiving frame allows comparatively long travelling distances along the individual positioning axes to be achieved, which increases the flexibility of the machine.

In a development of the invention, a measuring head can be attached to the machining device to allow simple measurement of the workpiece to be machined, before and after the machining. Owing to the high dimensional stability of the frame arrangement, high-quality measuring results can be achieved, with minor errors at worst.

A development of the invention provides that the displacement of the machining device along at least one of the positioning axes, preferably along each of the positioning axes, or/and optionally the pivoting about the pivot axis is effected with numerical control.

According to a preferred embodiment, the machining tool is a grinding wheel. It is, however, also possible to use other machining tools, such as, for example, eroding heads or the like.

The invention is explained below with reference to the accompanying figures, in which:

FIG. 9 shows a front view of the arrangement shown in FIG. 6.

Figure 1:
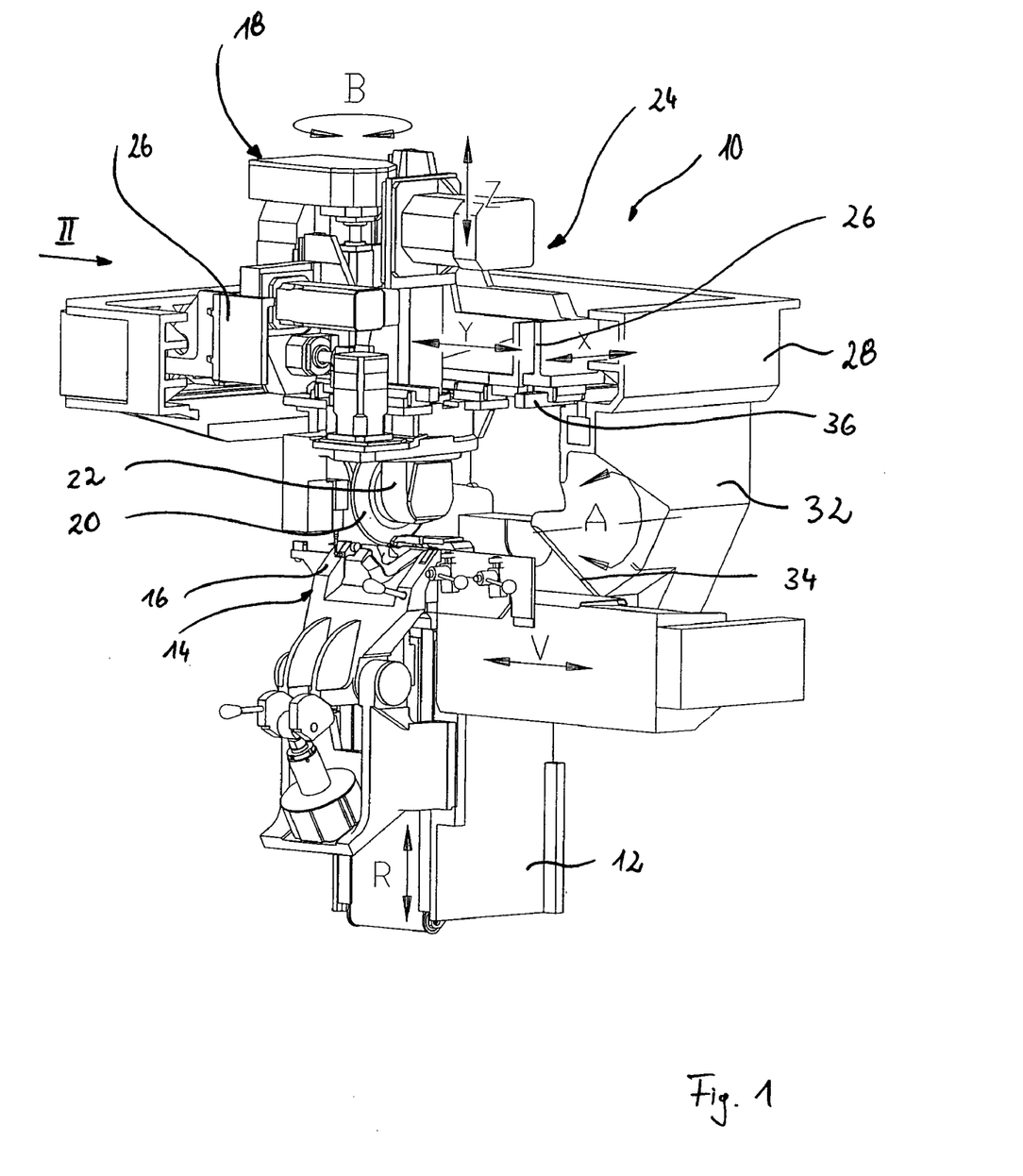
FIG. 1 shows a spatial, partially cutaway illustration of a first embodiment of the apparatus according to the invention.

In FIG. 1 an apparatus according to the invention is denoted generally by 10. This apparatus comprises a base 12, on which a clamping device 14 is provided. The clamping device serves for clamping a bandsaw blade (not shown) which can be clamped against a support by a pivotable clamping jaw 16.

The apparatus 10 furthermore comprises a machining device 18 with a machining tool 20 designed as a grinding wheel. The grinding wheel is rotationally driven via a rotary drive 22. The rotationally driven grinding wheel 22 can be positioned in different machining positions relative to the clamping device 14 along the positioning axes X, Y and Z shown in FIG. 1 via a multiaxis arrangement 24. Moreover, the grinding wheel 20 can be pivoted about the pivot axis B. Finally, it is also possible to pivot the multiaxis arrangement 24 about the pivot axis A. FIG. 1 furthermore shows a feed axis V, by means of which the bandsaw blade (not shown) can be fed tooth by tooth.

The structural design of the multiaxis arrangement 24 and its attachment to the base 12 will, in particular, be discussed below. For this purpose, reference is additionally made to FIGS. 2 to 4.

Figure 2:
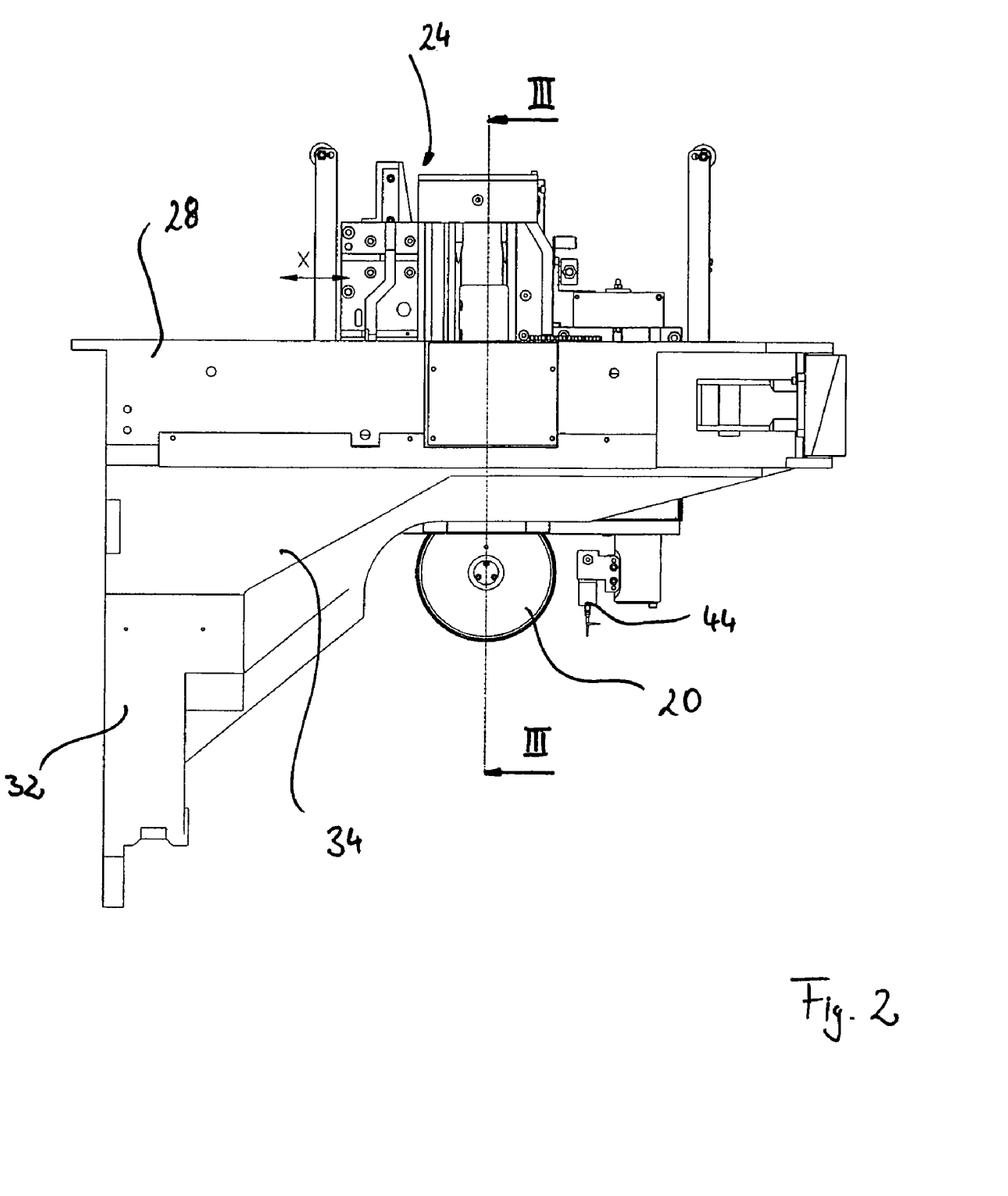
FIG. 2 shows a view in the viewing direction II—II according to FIG. 1, showing only the upper part of the apparatus according to the invention, namely the frame structure.
Figure 3:
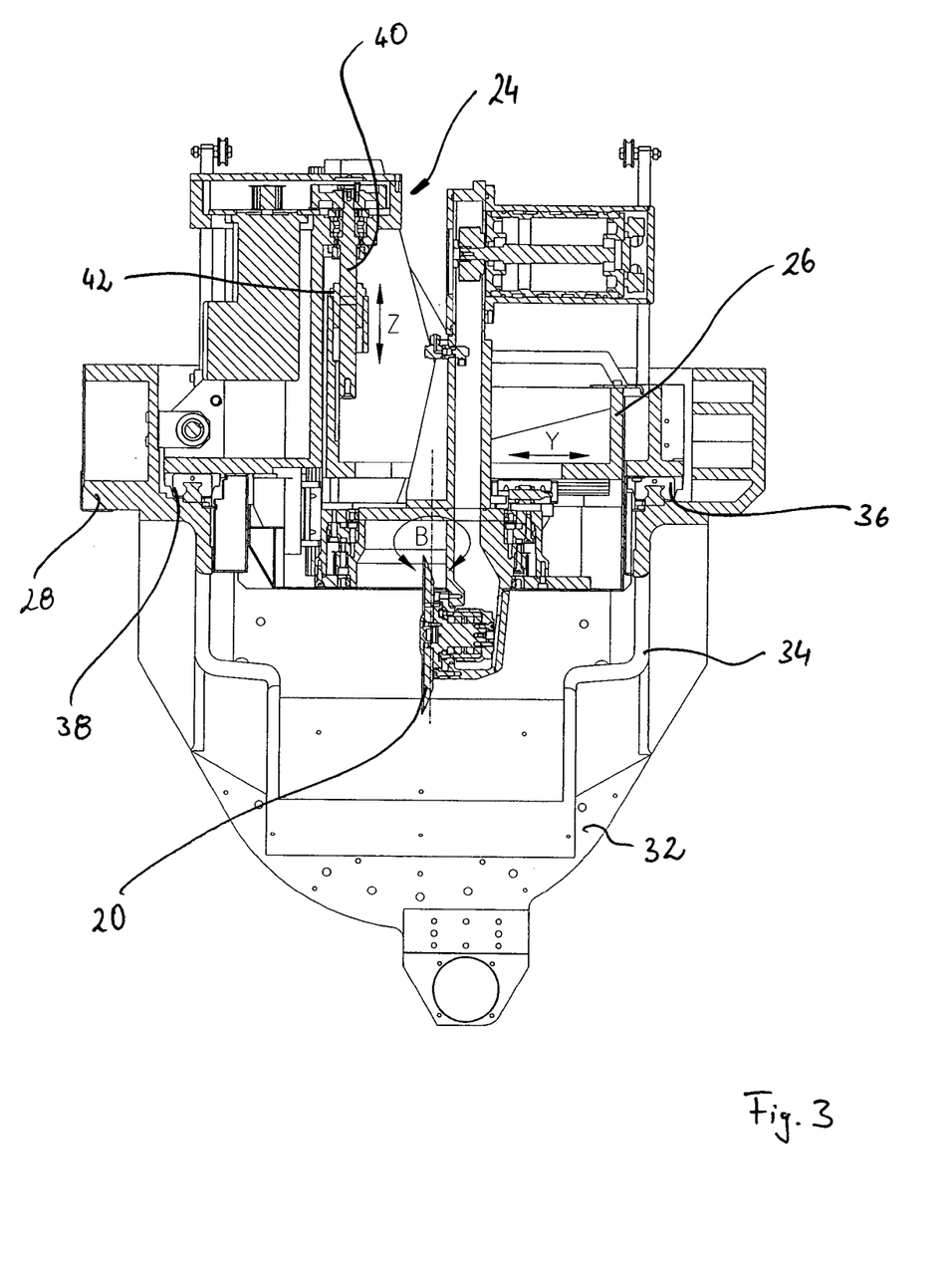
FIG. 3 shows a view of the part of the apparatus shown in FIG. 2, sectioned along section line III—III.
Figure 4:
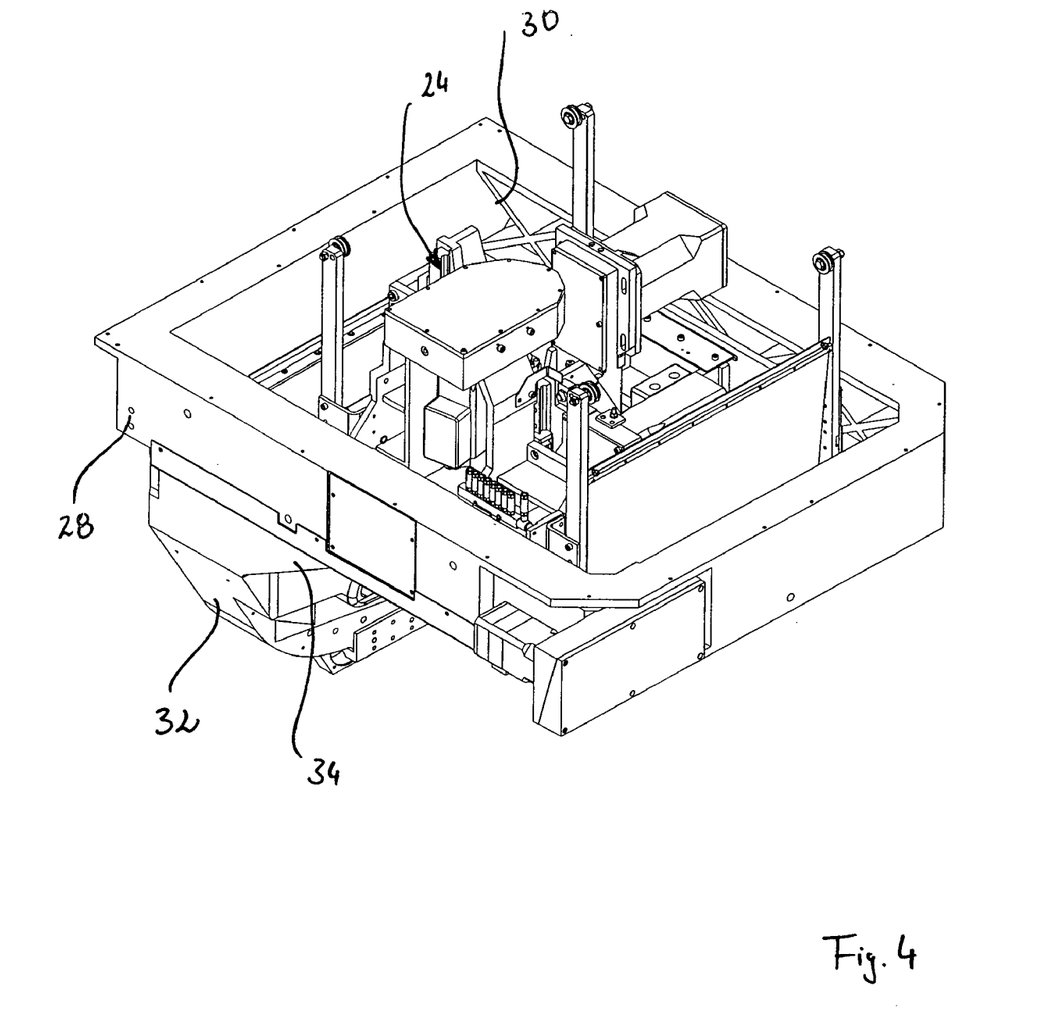
FIG. 4 shows a perspective view of the part of the apparatus according to the invention shown in FIG. 2.
Figure 4A:
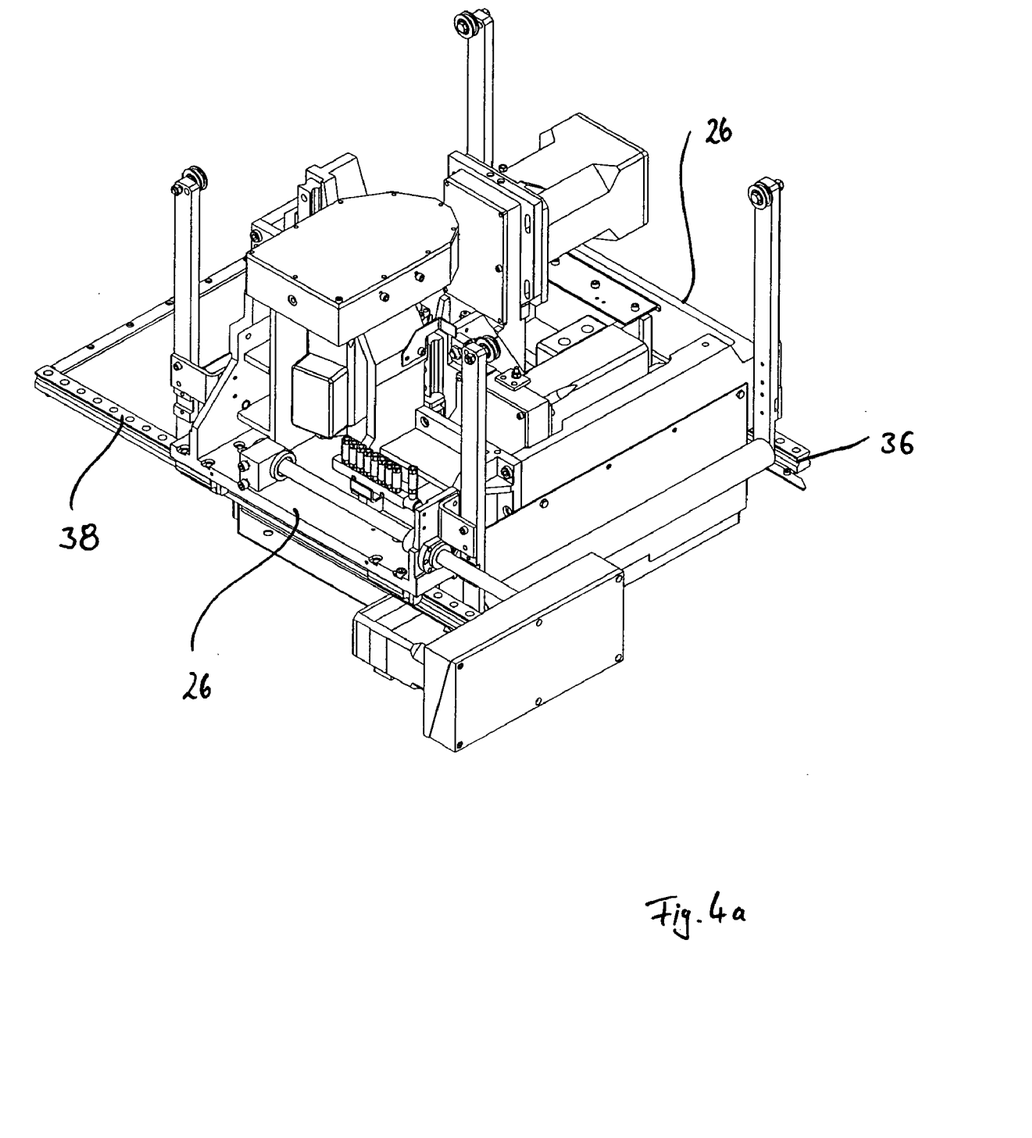
FIG. 4a shows a view corresponding to FIG. 4, but with the receiving frame omitted.
Figure 5:
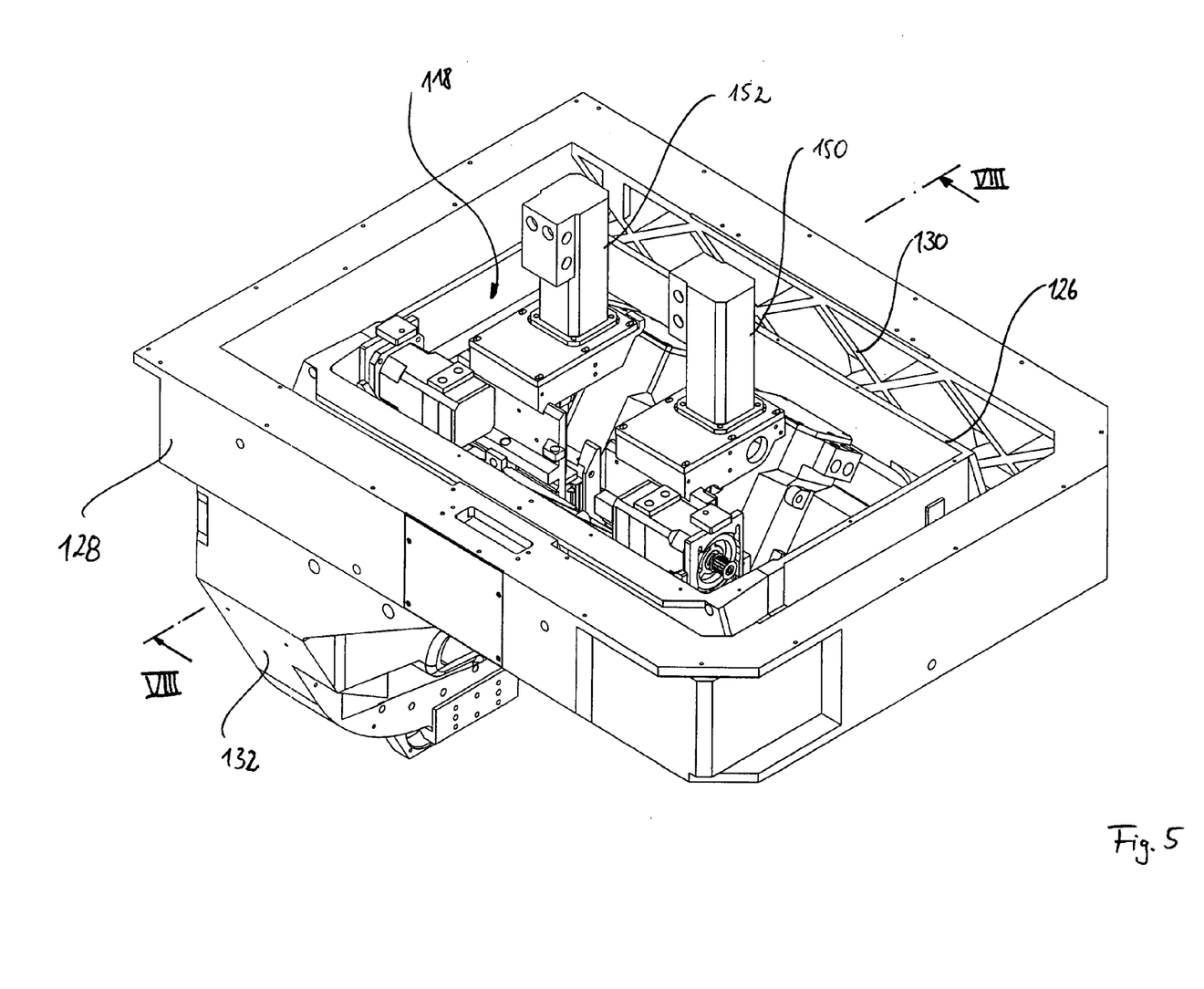
FIG. 5 shows a view corresponding to FIG. 4 of a second embodiment of the apparatus according to the invention.
Figure 6:
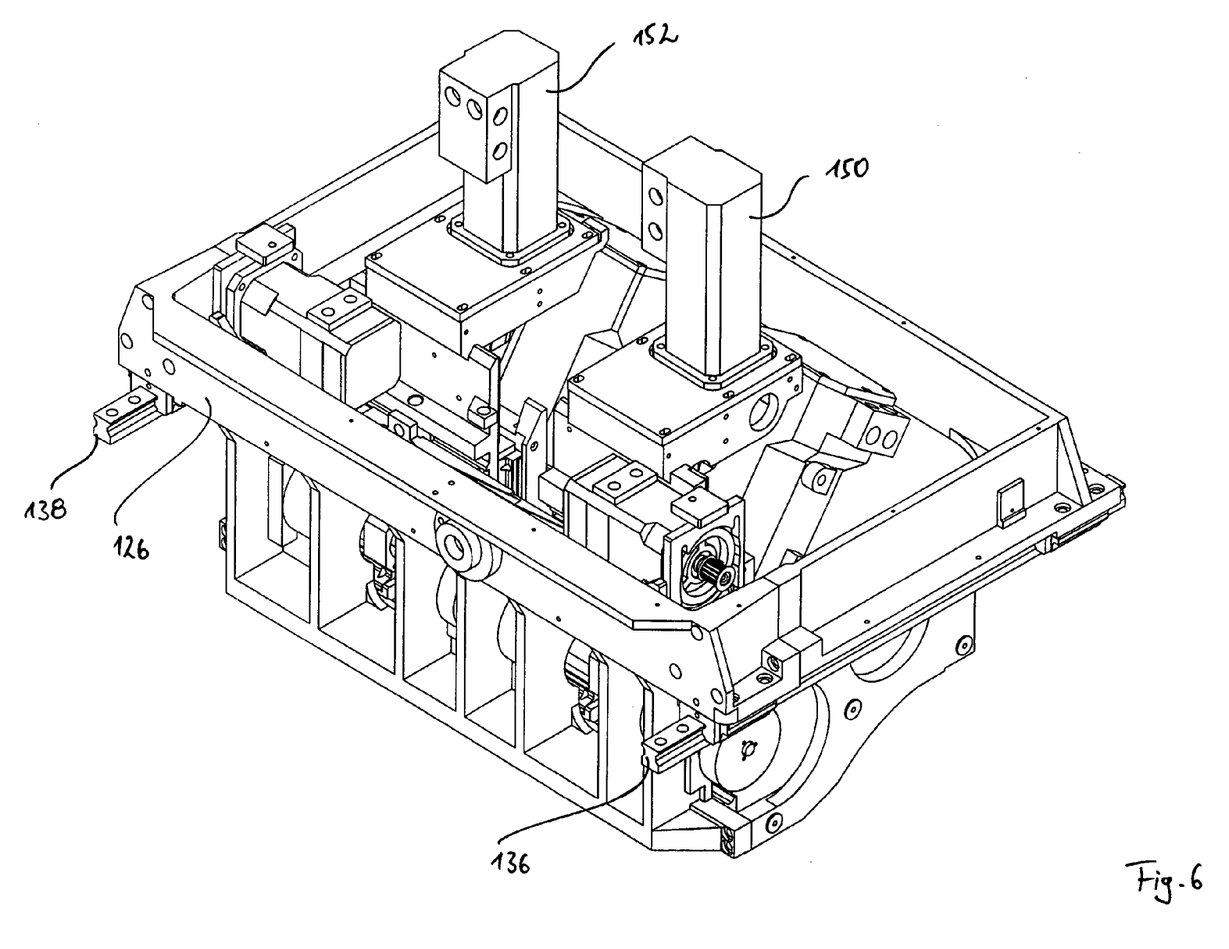
FIG. 6 shows a view corresponding to FIG. 5, but with the receiving frame omitted.

The multiaxis arrangement 24 is received in a support frame 26, as is apparent in particular from FIGS. 1, 3 and 4a. The support frame 26 is formed from a closed frame structure and has a central opening, through which the multiaxis arrangement 24 projects. In the exemplary embodiment according to FIGS. 1 to 4 and 4a, the multiaxis arrangement 24 comprises drive and guide means for movement of the machining tool 20 in the direction of the positioning axis Z and for movement in the direction of the positioning axis Y. Moreover, the multiaxis arrangement 24 also comprises drive and pivot means for pivoting the tool 20 about the pivot axis B.

The support frame 26 is received in a receiving frame 28 which likewise has a closed frame structure, which is partially stiffened by reinforcing ribs 30. The support frame 26 and the receiving frame 28 have a substantially rectangular shape and are preferably produced from highly stable cast material. Formed on the receiving frame 28 is a bearing arm 32, by means of which the receiving frame 28 can be attached to the base 12 and pivoted about the pivot axis A. The bearing arm 32 is also designed to be dimensionally stable, in particular by the use of reinforcing ribs, and is thus distortion-resistant.

The support frame 26 is supported on the receiving frame 28 via linear guides 36, 38 and is displaceable along these linear guides 36, 38 in the direction of the positioning axis X. For displacement along the individual positioning axes, linear drives, in particular spindle-nut drive devices, are provided in each case, as shown in FIG. 3 in particular for the displacement along the positioning axis Z. There, the threaded spindle is denoted by 40 and the nut by 42.

In FIG. 2 there can also be seen a measuring head 44 which is likewise displaceable with the machining device 18 in the region of the machining tool 20.

In operation, the machining tool 20 or measuring head 44 can be displaced along the positioning axes Y and Z by means of the multiaxis arrangement 24 within the support frame 26. Furthermore, the machining tool 20 can be rotated about the pivot axis B within the support frame 26. For displacement along the positioning axis X, the support frame 26 can be displaced with numerical control on the linear guides 36 and 38 within the receiving frame 28. The receiving frame 28 can, in turn, be pivoted about the pivot axis A for pivoting of the machining tool 20.

It is thereby possible to achieve a large number of machining situations in which the machining tool 20 can be brought into a desired relative position and relative orientation with respect to the workpiece to be machined, for example a bandsaw blade. As can be seen in particular from FIG. 1, the multiaxis arrangement 24 is compactly united within the support frame 26 and received therein. Machining forces occurring on the machining tool 20 can be led into the support frame 26 via comparatively short lever arms. The support frame 26 is likewise received in a compact but stable and distortion-resistant manner within the massively designed receiving frame 28 via linear guides 36 and 38, so that reaction forces can be led into the receiving frame 28 from the support frame 26, reliably and without significant distortions. From the receiving frame 28, these reaction forces can be led away into the base 12 via the bearing arm 32. Owing to the open frame structure, the multiaxis arrangement 24 can project out of the support frame 26 and the receiving frame 28 upwards and downwards in each case. Nevertheless, forces can be reliably led into the frame structure.

Through the arrangement shown in FIG. 1, the machining tool 20 can be brought up to the workpiece (not shown) to be machined, from above the machining position. The frame structure reliably supports the machining device 18 and enables comparatively large working strokes, allowing workpieces of diverse shapes and dimensions to be machined.

FIGS. 5 to 9 show a second exemplary embodiment of the apparatus according to the invention. To avoid repetition, only the differences from the exemplary embodiment according to FIGS. 1 to 4 and 4a will be referred to. For ease of description, the same reference symbols as before are used, but preceded by the numeral 1.

Figure 7:
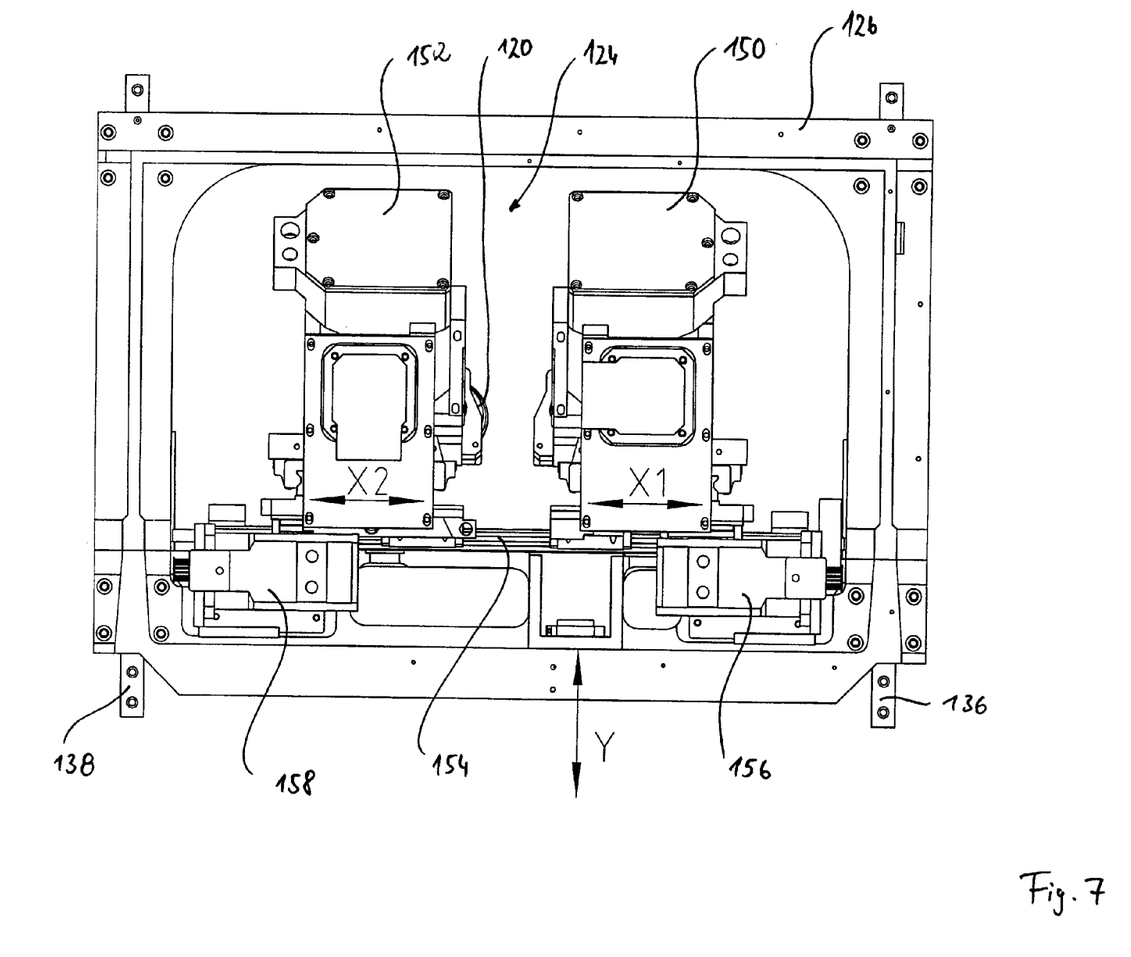
FIG. 7 shows a plan view of the part of the second exemplary embodiment shown in FIG. 6.
Figure 8:
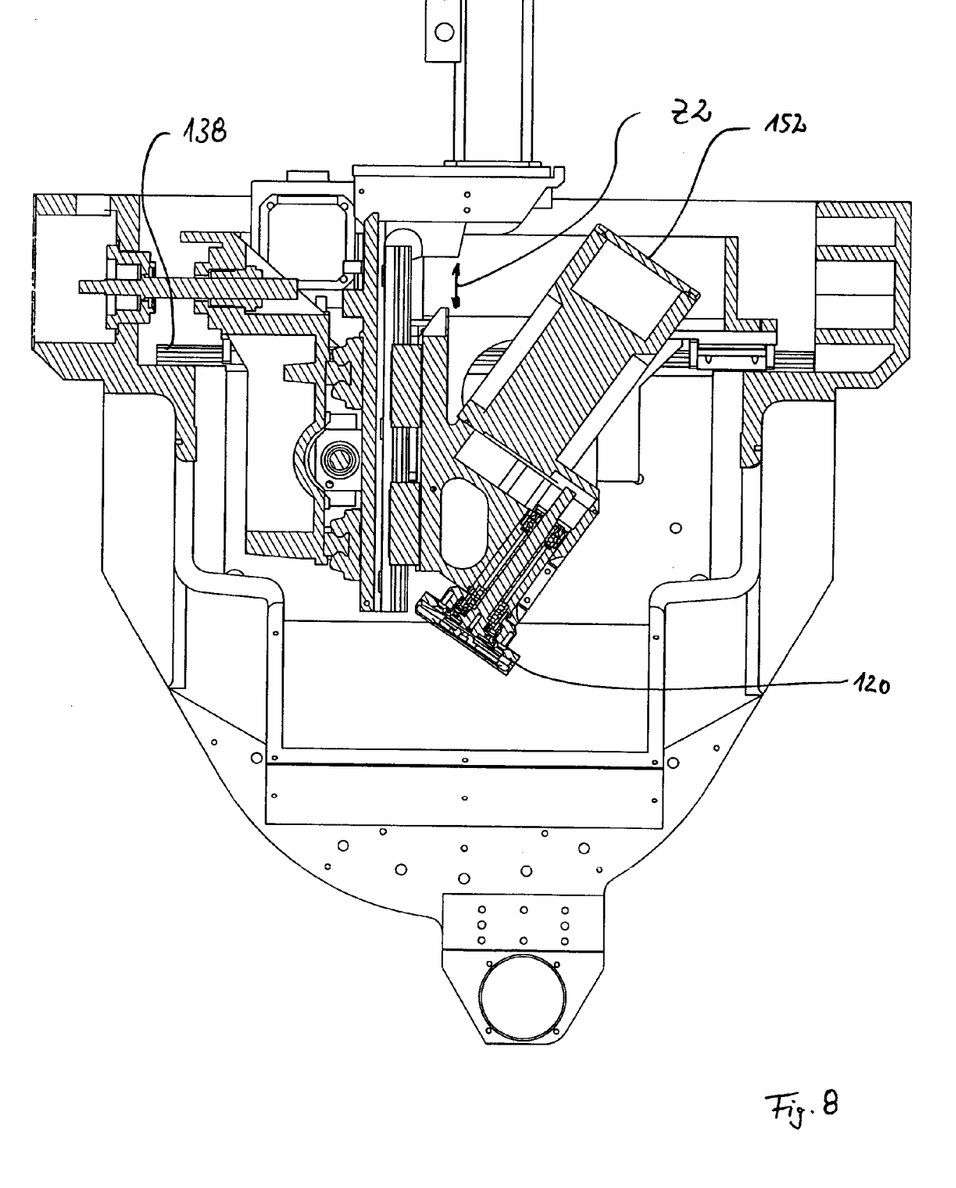
FIG. 8 shows a sectional view along the section line VIII—VIII from FIG. 5.

In the second exemplary embodiment according to FIGS. 5 to 9, the multiaxis arrangement 124 arranged in the receiving frame is designed with two rotationally driven machining units 150 and 152. Both machining units each comprise a rotationally drivable machining tool, namely in each case a rotationally drivable grinding wheel, as shown in FIG. 8 in section and in FIG. 9. The two machining units 150 and 152 are linearly guided on a common guide arrangement 154 within the support frame 126 and can be displaced independently of one another along the positioning axis X via assigned drives 156, 158, as shown in FIG. 7. Furthermore, both machining tools can be displaced, along the Z-axes assigned to the respective machining units 150, 152, in the direction of the positioning axis Z. Of these axes, the axis Z2 is shown in FIG. 8. It is thus possible to position both machining tools independently of one another relative to the workpiece (not shown in FIGS. 5 to 8) to be machined. Via the linear guides 136 and 138, the support frame 126 can, in turn, be displaced relative to the receiving frame 128 in the direction of the positioning axis Y, as likewise shown in FIG. 7. The receiving frame 128 can again be displaced relative to the base via the bearing arm 132 in a manner pivotable about the pivot axis A, as shown in FIG. 1 for the first exemplary embodiment.

With the second embodiment of the apparatus according to the invention shown in FIGS. 5 to 9, flank grinding operations can be performed on the workpiece to be machined. The apparatus according to the second exemplary embodiment according to the invention shown in FIGS. 5 to 9 has the same advantages as described above with regard to the first exemplary embodiment, namely a high dimensional stability, a high variability in the machining of workpieces and a compact structure coupled with simple assembly and good accessibility to the machining position.

The invention claimed is:

1. Apparatus for machining workpieces, in particular provided with cutting teeth, such as bandsaw blades or circular-saw blades for example, comprising:
    a base;
    a machining device displaceable relative to the base and having at least one machining tool rotationally drivable about a first drive axis, and
    a clamping device for securing the workpiece to be machined, the machining device being designed with a multiaxis arrangement, by means of which the machining tool can be positioned in different machining positions relative to the workpiece to be machined,
    characterized in that the multiaxis arrangement is received within a support frame having a closed frame structure surrounding an opening provided on at least one side of the frame, such that the machining tool extends out from the opening towards the workpiece to be machined and that the support frame is mounted to the base wherein the support frame is received in a receiving frame, the receiving frame being pivotable about a pivot axis relative to the base.

2. Apparatus according to claim 1,
    characterized in that the multiaxis arrangement is received in the opening of the support frame and surrounded by the support frame.

3. Apparatus according to claim 1,
    characterized in that the multiaxis arrangement has a first positioning axis which enables displacement of the machining tool within, the support frame in the direction along the longitudinal extent or the transverse extent of the support frame.

4. Apparatus according to claim 3,
    characterized in that the multiaxis arrangement has a second positioning axis which enables displacement of the machining tool within the support frame in the direction orthogonal to a plane defined by the direction of the longitudinal extent and the direction of the transverse extent of the support frame.

5. Apparatus according to claim 4,
    characterized in that the support frame is displaceable in the receiving frame along a third positioning axis which enables displacement in the direction along the transverse extent or the longitudinal extent of the support frame, preferably in the direction orthogonal to the first positioning axis and the second positioning axis.

6. Apparatus according to claim 5,
    characterized in that the displacement of the machining device along at least one of the positioning axes is effected with numerical control.

7. Apparatus according to claim 1,
    characterized in that the machining device has a second machining tool rotationally drivable about a second drive axis, the first drive axis and the second drive axis of the one machining tool and the second machining tool running substantially parallel to one another.

8. Apparatus according to claim 7, characterized in that the first drive axis and second drive axis are assigned to a first positioning axis and are displaceable along the first positioning axis independently of one another.

9. Apparatus according to claim 1, characterised in that the support frame is received in the opening of the receiving frame and enclosed by the receiving frame.

10. Apparatus according to claim 1, characterized in that the machining tool engages, at a predetermined geometrical point, on the workpiece to be machined, wherein said pivot axis runs substantially through the geometrical point.

11. Apparatus according to claim 1, characterized in that the receiving frame as viewed in the vertical direction to the base is arranged above the clamping device and the machining device projects out of the receiving frame downwards towards the clamping device.

12. Apparatus according to claim 1, further comprising a measuring head for conducting control measuring steps on the workpiece to be machined, wherein the measuring head is attached to the machining device.

13. Apparatus according to claim 1, characterized in that the machining tool is a grinding wheel or an eroding tool.

* * * * *